March 25, 1941.    D. B. GISH    2,236,349
MEANS FOR GRIPPING WORK
Filed Feb. 15, 1940    2 Sheets-Sheet 1
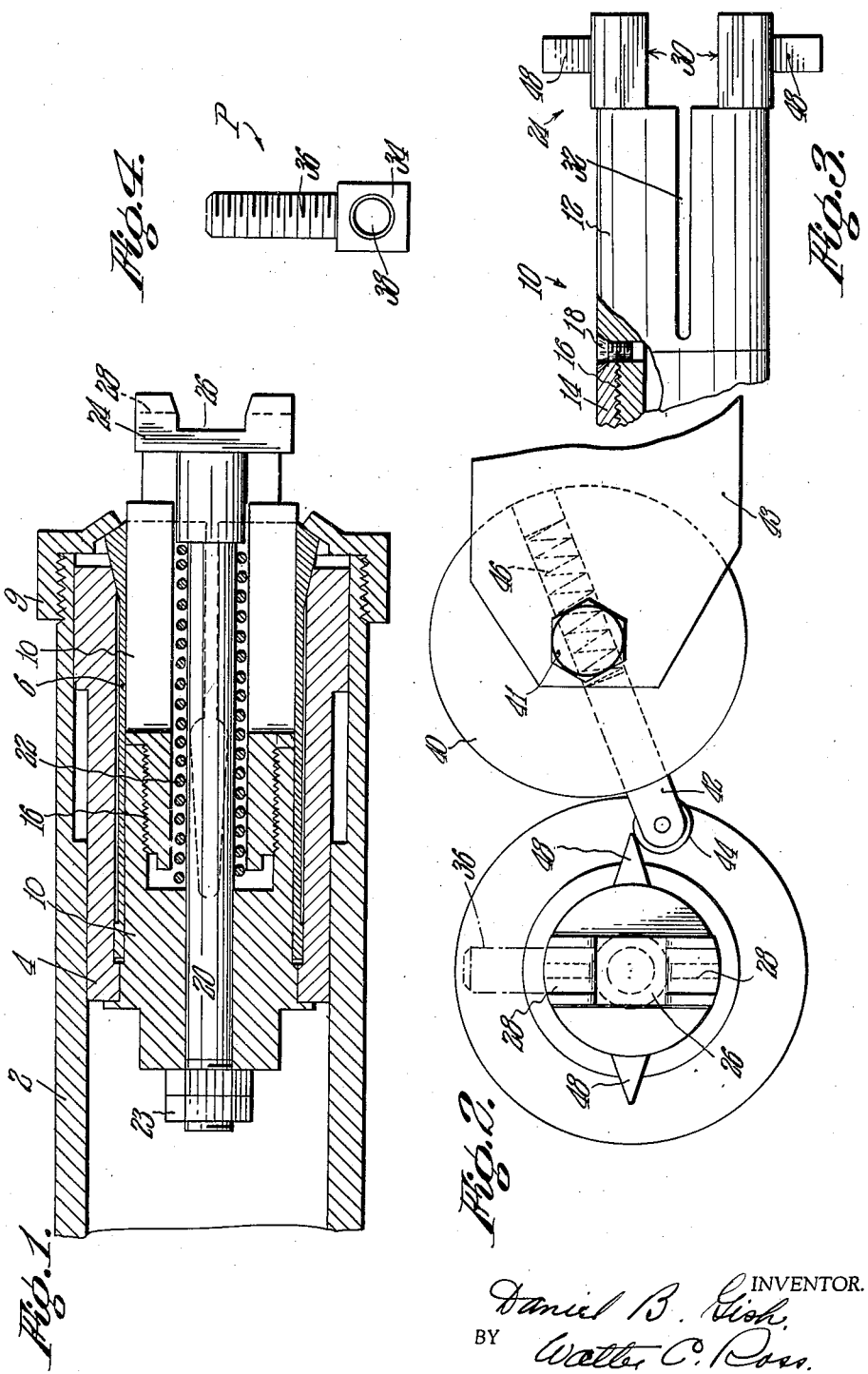
INVENTOR.
Daniel B. Gish,
BY Walter C. Ross.
ATTORNEY.

Patented Mar. 25, 1941

2,236,349

UNITED STATES PATENT OFFICE 2,236,349

MEANS FOR GRIPPING WORK

Daniel B. Gish, West Springfield, Mass.

Application February 15, 1940, Serial No. 319,110

15 Claims. (Cl. 29—38)

My invention relates to improvements in the art of machining parts and is directed more particularly to improvements in automatic and successive machining of small parts.

The principal objects of my invention are directed to the provision of means for performing successive operations, as in an automatic machine such as an automatic screw machine, on successive parts or pieces of work which are rotated by a continuously rotating spindle.

According to special features of my invention, it is possible to hold a piece of work by a continuously rotating spindle in such a way that various operations may be performed on the work in directions transversely of the longitudinal axis of the work, and to release the work so as to facilitate the holding of another piece and operation thereupon in the same manner without the stopping of the spindle.

It is a common practice to operate on the end of a bar of stock so as to form and to sever therefrom parts of various forms. It is a well known practice to place the successive pieces of work in the work-holding devices of the spindles of various machines. Except where parts are formed on the ends of bars in automatic machines, such as automatic screw machines, it has been necessary heretofore to start and to stop the spindle so as to insert in and remove work from the holding devices.

In automatic screw machines and the like, it is customary to form pieces of work on the end of a bar of stock which is gripped to, and rotated by, a spindle. It is desired, in order to provide a lower cost of operation and greater efficiency therein, to continuously rotate the spindle. However, this is impossible when other than round bars such as square bars, hexagonal bars, and the like, are being worked, since the collet tends to grip the bar to the spindle at all times. Hence, it is necessary to stop the spindle in order to stop the work bar from rotation.

It is another object of my invention to provide means which obtain all of the advantages of the speed and efficiency of automatic screw machines in view of the fact that successive pieces of work may be inserted in and removed from work-holding means which are associated with the spindle in such a way that the spindle may continuously operate while the work-holding device is alternately stopped and rotated. Thereby successive pieces of work are rotated by the spindle without the necessity of stopping the machines so as to remove one piece and to insert another.

According to my invention, by reason of the novel construction, the spindle may be in continuous rotation since the collet may grip the bar for rotation by the spindle or release the bar so that it is not necessarily rotated by the spindle. In other words, according to this invention, the spindle may continuously rotate without rotating the bar of work, when the bar is released by the collet, thereby eliminating the loss of time consumed in stopping the spindle which is always necessary where flat-sided bars are never free of the spindle as in prior art constructions.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a sectional elevational view through the end portion of a hollow spindle with the apparatus of my invention associated therewith;

Fig. 2 is an end elevational view of the apparatus which is shown in Fig. 1;

Fig. 3 is a plan view of the tube of the work-holding device of my invention;

Fig. 4 is an elevational view showing one of the forms of work which may be held and rotated for operation thereon according to my invention and which is indicated here for purposes of disclosure.

Figure 5:
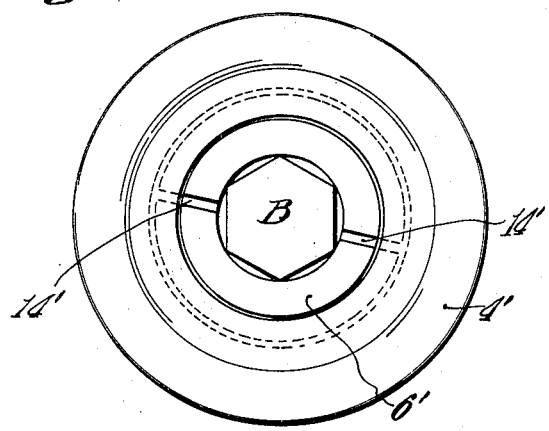
Fig. 5 is an end elevational view of a hollow spindle and collet construction embodying certain of the novel features of the invention.

Referring now to the different figures of the drawings more in detail, wherein like numerals refer to like parts in different figures of the drawings, and referring more particularly to the preferred form of my invention, selected for illustrative purposes, I have shown the end portion of a spindle of an automatic machine, such as an automatic screw machine, which is represented by 2. This may be rotated continuously inasmuch as, according to my invention, it is not necessary that it be stopped so as to permit work to be inserted in and removed from the holding mechanism.

A tubular member or sleeve 4 is disposed within the spindle 2 and disposed within said sleeve there is a collet 6 which is split inwardly from its outer end as is indicated so as to be contractable for purposes hereinafter to be more fully explained.

The outer end of the collet 6 is tapered as is shown in Fig. 1. As the sleeve 4 is moved forwardly in the spindle 2, by such means as is usually associated therewith for that purpose, the action is such that a collar 9 on the end of the spindle 2 acts on the collet 6 so as to contract or to decrease its inner diameter so that it grips an inner tubular member generally indicated by 10 therein whereby said tubular member 10 is then rotated by the spindle 2. When the sleeve 4 is moved or is allowed to move inwardly of the spindle, the tubular member 10 is released. Hence the tubular member 10 is rotated or is not rotated according to whether or not it is gripped to the spindle 2.

The inner tubular member 10 preferably includes forward and rear sections 12 and 14 respectively which are united to each other by screw threads 16 as is shown. A screw 18 or other means holds the sections 12 and 14 against relative turning movements so that the parts 12 and 14 constitute a unitary member.

A bolt or rod member 20 is slidable in the member 10 and is urged outwardly or forwardly thereof by a spring member 22 which is disposed therearound. A nut 23 limits outward movements of the rod relative to the inner tubular member 10.

In the form of my invention being described, a head 24 on the outer end of the rod member 20 has a central socket 26 and grooves 28 leading radially therefrom. The head 24 is loosely mounted in a slot 30 at the forward end of the forward section 12 of the inner tubular member 10 whereby the rod member 20 and the head 24 are movable axially but are held against rotation relative to the section 12. The section 12 is split as is shown at 32 in Fig. 3 so as to be contractable and it is adapted to be so acted upon by the contraction of the collet 6.

The head 24 may be formed in various ways for use in connection with various pieces of work of differing forms, sizes and shapes.

For an illustration, there is shown in Fig. 4 a piece of work P having a body 34 and a stem or shank 36 which it is desired to hold and to operate upon as, for example, by drilling or tapping operations in a direction opposed to the longitudinal axis of the work. Thus at 38 is represented a tapped hole, in connection with which there probably would be certain drilling operations.

The head 24 is formed so that the body 34 of the piece P is received in the socket 26 thereof with the stem 36 of the piece P disposed in one of the slots 28. Preferably the body 34 of the piece P is wider than the head 24 so that opposite side faces of the body 34 extend somewhat beyond the head 24. Thus, as the section 12 of the inner tubular member 10 is contracted, the sides of the slot 30 firmly grip and hold the piece P in position. When in operation and particularly when the spindle member 2 is in rotation and the collet 6 in its expanded position, a piece, such as P, may be inserted in the head 24 by means of an automatic feed mechanism, or by manual means, all as may be desired.

It has been found to be desirable to feed successive pieces of work to the holding means by means of suitable feed means which are operated by a slide or other cam-operated element of the automatic screw machine.

With a piece P in the socket of the head 24, a plunger or other tool of the automatic machine moves toward the spindle so as to engage the piece P and to move the head 24 into the socket 30 against the action of the spring 22. When in this position, the means, associated with the spindle which is adapted for acting on the sleeve 4, operates to bring about a contraction of the collet member 6 and thereby a contraction of the inner tubular member 12.

In this way, the piece P is held and is rotated by the spindle so that one or more tools may be advanced for their various operations upon the work. There may be any desired number of successive operations on the piece P of course but it will be understood that the important feature is that the piece is gripped and is rotated by the spindle for the various operations after which time, it is released.

At the completion of the desired operations upon the piece P, the collet member 6 is released or is allowed to expand to release the member 10 so that it expands to release the work whereby the spring 22 acts to move the rod 20 forwardly so that the completed piece P is ejected.

When the member 10 is released, it is not necessarily rotated by the spindle, but in order to position the head 24 for receiving another piece P, it is desired that the member 10 be releasably held against rotation or that it come to a rest at some particular location so as to facilitate the insertion of another piece P.

It has been found to be desirable to releasably hold the member 10 in a rest position, and to that end, a member 40 has a plunger member 42 which carries a roll or the like 44. A spring 46 which is disposed behind the plunger member 42 urges the same outwardly whereby the plunger member 42 is yieldably engaged. The member 40 is carried by a member 43 which may represent a back slide for purposes of description and is secured thereto by means of a bolt 41 or the like.

One or more radially extending projections such as 48 are carried by the forward section 12 of the inner tubular member 10.

As the section 12 is released by the collet 6, at the completion of the machining operations on the piece P, the member 43 is moved towards the spindle so that one of the projections 48 is brought up against the roll 44, whereby the section 12 is held against rotation by the continuously rotating spindle. Thereby the work receiving parts of the head 24 are in position for receiving a piece of work.

When a piece P has been inserted in the head 24, the collet operates as heretofore described so that the section 12 is gripped to the spindle and is rotated thereby. As the spindle rotates, the projection 48 acts on the roll 44 so as to depress the plunger member 42 against its spring thereby to allow the section 12 to rotate. In this way, the stop mechanism or means for releasably holding the section 12 is in a predetermined position which is adapted especially for receiving the successive pieces of work which may be fed thereto by either automatic or manual means.

Successive pieces of work are thus secured to the spindle for various machining operations and are subsequently released whereby it becomes possible to attain high speed and efficiency and to permit operations on the work in directions which are opposed to the axis of said work, as distinguished from operations for forming pieces on the end of a bar of stock. That is to say, instead of operating on the end of a bar in an automatic machine so as to produce pieces of work, I operate on pre-formed pieces so that, by automatically feeding the pieces to the holding means, it is possible to operate on the same with a degree of speed and efficiency which is equal to that of the prior art practice.

Figure 6:
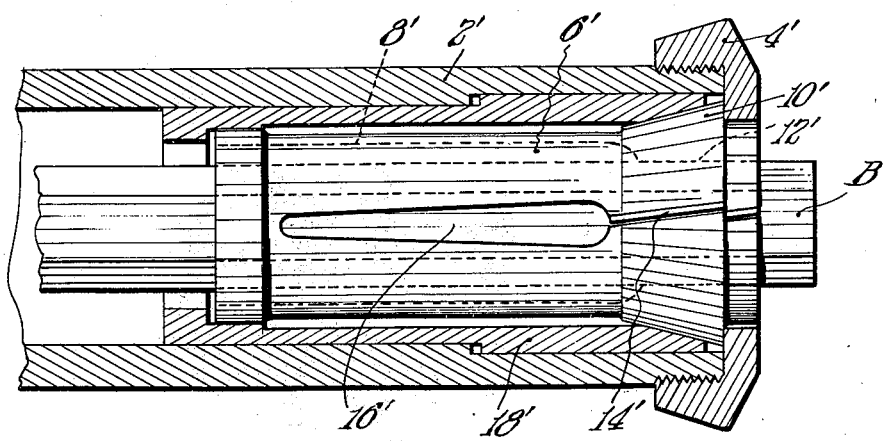
Fig. 6 is a longitudinal sectional elevational view through the forward end of the hollow spindle shown in Fig. 5 with the novel features of the invention associated therewith.

In Figs. 5 and 6, I have shown a modified form of the construction of the device of my invention wherein a spindle of the hollow type is represented at 2'. This spindle may also be that of an automatic screw machine or the like and it is also adapted for continuous rotation so as to eliminate the necessity of stopping and starting the machine intermittently as heretofore has been necessary.

A nut 4' is provided at the forward end of the spindle 2' and is fixed or associated therewith in some suitable manner as by screw threads, as shown, or the like.

A collet is represented by 6' which has a longitudinal bore 8' therein and a head 10' on its forward end which is provided with a taper on the outer side thereof, as is shown. The bore 8' is preferably restricted at 12' for gripping a bar of stock which represented by B and which in the form of the invention being illustrated herein is hexagonal in cross section.

The outer or head end of the collet has one or more slots indicated by 14' through the wall thereof. These slots extend longitudinally into an opening such as 16' and provide yieldability in the collet so as to facilitate the contraction of the end of the collet so that the bar may be gripped thereby. Being more or less spring-like, the collet is adapted to contract readily and to hold and to release a bar such as B extending therethrough. A sleeve such as 18' within the spindle acts on the collet so as to contract it.

In association with the spindle, there is usually a suitable mechanism to urge the sleeve 18' forwardly so that its forward end acts on the collet so as to cause the same to contract and to grip the bar of work. When the member 18' is eased off, or is moved rearwardly, or when the end pressure is removed therefrom, there is such a movement of the sleeve and the collet that the springiness of the collet causes or allows the outer end thereof to expand and to release the bar.

The slot or slots 14' which extend longitudinally and radially of the collet at its outer or head end are preferably extended in a plane or planes disposed at an angle relative to a plane passing through the longitudinal axis of the collet with the result that the slot or slots are out of alignment with said axis.

With the slot or slots so disposed in the way just described, any longitudinal corners or other edges of the bar stock do not enter the slot or slots of the collet, whereby the collet acts on a flat-sided bar of stock just as it would act on bar stock of a round cross-sectional shape. In this way, when the collet releases the bar of stock, the bar and collet is disengaged from the bar so that it may rotate with the spindle, but the bar is not necessarily rotated thereby. Thus when the bar is released by the collet, it is free of the spindle, which in turn may rotate continuously, and it is not necessary to stop the spindle when it is desired to stop only the movement of the bar.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. The combination with the hollow spindle and contractable hollow collet of an automatic machine with means for gripping and rotating successive separate pieces of work comprising, a contractable member in the collet adapted to be contracted thereby, and a work member in said contractable member for receiving a piece of work, said contractable member being adapted to grip a piece of work in said work member when said contractable member rotates.

2. The combination with the hollow spindle and contractable hollow collet of an automatic machine with means for gripping and rotating successive separate pieces of work comprising, a contractable member in the collet adapted to be contracted thereby, a work member in said contractable member for receiving a piece of work, said rotating contractable member being adapted to grip a piece of work in said work member when said contractable member rotates and said work member being shiftable axially of said contractable member, and yieldable means acting on said contractable member to move said work member in one direction.

3. The combination with the hollow spindle and contractable hollow collet of an automatic machine with means for gripping and rotating successive separate pieces of work comprising, a contractable member in the collet, a work member reciprocable axially in the collet having a socket in the forward end thereof to receive a piece of work, spring means to urge said work member forwardly of said contractable member, and means for rotating the work member by said contractable member.

4. The combination with the hollow spindle and contractable hollow collet of an automatic machine with means for gripping and rotating successive separate pieces of work comprising, a contractable member in the collet, a work member reciprocable axially in the collet having a socket therein to receive a piece of work, spring means to urge said work member forwardly of said contractable member, and means for rotating said work member by said contractable member.

5. The combination with the hollow spindle and contractable hollow collet of an automatic machine with means for gripping and rotating successive separate pieces of work comprising, a hollow contractable member in the collet, a work member movable axially in said contractable member and having a work receiving means at its outer end, spring means to urge said work member in one direction, and means holding said contractable member and said work member against relative rotation.

6. The combination with the hollow spindle and contractable hollow collet of an automatic machine with means for gripping and rotating successive separate pieces of work comprising, a hollow contractable member in the collet, a work member movable axially in said contractable member, spring means to urge said work member in one direction, and means holding said contractable member and said work member against relative rotation.

7. The combination with the hollow spindle and contractable hollow collet of an automatic machine with means for gripping and rotating successive separate pieces of work comprising, a hollow contractable member in the collet adapted to be contracted thereby and having in the forward end thereof jaws for gripping a piece of work, a work member movable in the jaws for receiving a piece of work to be clamped by the jaws, and spring means for moving said work member outwardly of the jaws.

8. The combination with the hollow spindle and contractable hollow collet of an automatic machine with means for gripping and rotating successive separate pieces of work comprising, a hollow contractable member in the collet adapted to be contracted thereby and having in the forward end thereof jaws for gripping a piece of work, a work member movable in the jaws for receiving a piece of work to be clamped by the jaws, and spring means for moving said work member outward of the jaws, the jaws being formed by a slot provided in said contractable member.

9. The combination with the hollow spindle and contractable hollow collet of an automatic machine with means for gripping and rotating successive separate pieces of work comprising, a hollow contractable member in the collet adapted to be contracted thereby and having jaws for gripping a piece of work, a work member movable in the jaws for receiving a piece of work to be clamped by the jaws, and spring means for moving said work member outwardly of the jaws.

10. The combination with the hollow spindle and contractable hollow collet of an automatic machine with means for gripping and rotating successive separate pieces of work comprising, a contractable member in the collet formed from joined together forward and rearward parts, the forward part being provided with a longitudinal slot whereby the forward portion thereof may be contracted by the collet, a slot provided in the forward end of the forward part forming jaws, and a work holder in the slot being reciprocable axially thereof and provided with a socket for receiving a piece of work which is engageable by the jaws whereby the work is held and rotated when said contractable member is contracted by the collet.

11. The combination with the hollow continuously rotating spindle of a screw machine or the like of means for holding successive pieces of work comprising, a hollow contractable member in said spindle, a collet therearound contractable to contract said member, a work member adapted to receive and hold successive pieces of work, and means releasably engaging said work member to hold the same against rotation by the spindle to locate the same in predetermined position.

12. The combination with the hollow spindle and contractable hollow collet of an automatic machine with means for rotating work comprising, a contractable member within the collet and contractable thereby having means associated with its outer end for receiving a piece of work to be rotated, yielding means and means on the outer end of said contractable member engageable therewith whereby said contractable member is held against rotation when released by said collet.

13. The combination of the hollow spindle of an automatic screw machine with a collet for gripping an angular sided bar of stock to said spindle, the collet being provided with a longitudinally extending round bore for a bar of stock and having radially-extending slots in the wall thereof at its forward end which are inclined longitudinally relative to planes passing through the longitudinal axis of the collet.

14. A spindle construction for an automatic screw machine or the like comprising in combination, a hollow spindle, a collet having a cylindrical longitudinal bar receiving and gripping bore and an outer tapering head portion, means associated with said spindle for acting on the head portion of said collet to contract and to release the same, said collet having radially and longitudinally disposed slots in the wall of the head portion which are disposed in planes at an angle relative to planes extending through the axis of said collet so as to be angularly disposed relative to longitudinally extending edge or corner portions of bar stock extending through said collet.

15. A gripping device for bar stock comprising, a collet having a longitudinally extending cylindrical bore for a bar of stock, the forward end portion of said collet having an outside tapering head portion and being provided with slots through the wall thereof which extend longitudinally inwardly from the forward end face of the head in planes angularly disposed relative to planes extending longitudinally of and passing through the axis of said collet whereby the forward end portion of the collet is contractable to grip a bar of stock having longitudinally extending corners or edges.

DANIEL B. GISH.